United States Patent [19]

Lewan

[11] Patent Number: 5,062,953

[45] Date of Patent: Nov. 5, 1991

[54] BELT TYPE OIL SKIMMER WITH HORIZONITAL ROLLERS

[75] Inventor: Philip C. Lewan, Jackson, Mich.

[73] Assignee: Camshaft Machine Company, Jackson, Mich.

[21] Appl. No.: 521,416

[22] Filed: May 10, 1990

[51] Int. Cl.$^5$ .............................................. C02F 1/40
[52] U.S. Cl. ................................... 210/232; 210/241; 210/242.4; 210/400; 210/526; 210/924
[58] Field of Search ...................... 210/241, 232, 242.3, 210/242.4, 386, 396, 400, 523, 525, 526, 776, 923, 924

[56] References Cited

U.S. PATENT DOCUMENTS

| | | | |
|---|---|---|---|
| 3,314,545 | 11/1963 | Grabbe et al. | 210/923 |
| 3,426,902 | 2/1969 | Kilpert et al. | 210/923 |
| 3,487,927 | 1/1970 | Yahnke | 210/400 |
| 3,508,663 | 10/1970 | Brill | 210/396 |
| 3,612,277 | 10/1971 | Van Stavern et al. | 210/923 |
| 3,640,394 | 2/1972 | Brill et al. | 210/526 |
| 3,695,451 | 10/1972 | Schmidt, Jr. et al. | 210/924 |
| 3,709,369 | 1/1973 | Brill et al. | 210/523 |
| 3,762,558 | 10/1973 | Anderson | 210/423 |
| 4,061,569 | 12/1977 | Bennett et al. | 210/924 |
| 4,154,683 | 5/1979 | Timmer et al. | 210/386 |
| 4,274,957 | 6/1981 | Koller | 210/526 |
| 4,582,604 | 4/1986 | Bashaw | 210/396 |
| 4,652,372 | 3/1987 | Threadgill | 210/526 |
| 4,797,205 | 1/1989 | Kitaman | 210/242.3 |
| 4,872,997 | 10/1989 | Becker | 210/241 |
| 4,876,011 | 10/1989 | Betts et al. | 210/924 |

*Primary Examiner*—Stanley S. Silverman
*Assistant Examiner*—Christopher Upton
*Attorney, Agent, or Firm*—Beaman & Beaman

[57] ABSTRACT

Apparatus for removing oil from the surface of a liquid, such as a coolant, employing an endless belt partially submerged in the liquid passing through the surface. The belt is threaded over the upper portion of a primary drive roller having a horizontal axis and pressure rollers mounted upon linkage sets are biased towards opposite sides of the primary roller in engagement with the belt to squeeze the collected oil from the belt permitting the oil to flow to a collector located below the rollers. The linkage sets include reversing rollers, and the apparatus is constructed to readily permit belt replacement.

18 Claims, 3 Drawing Sheets

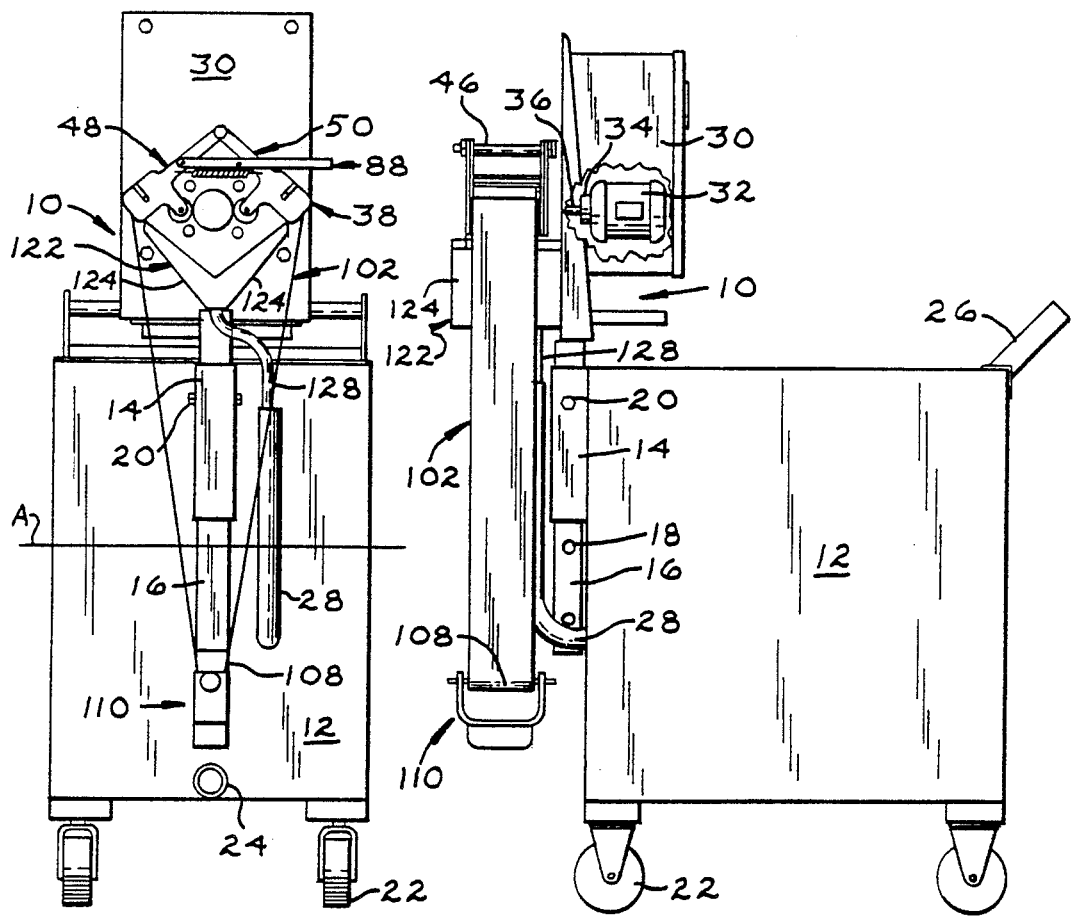
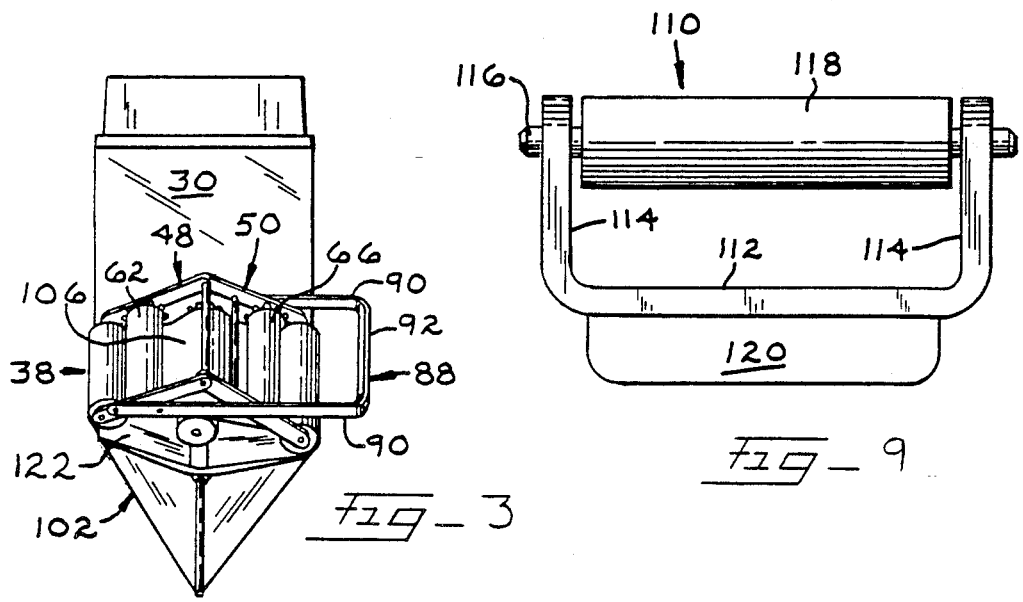

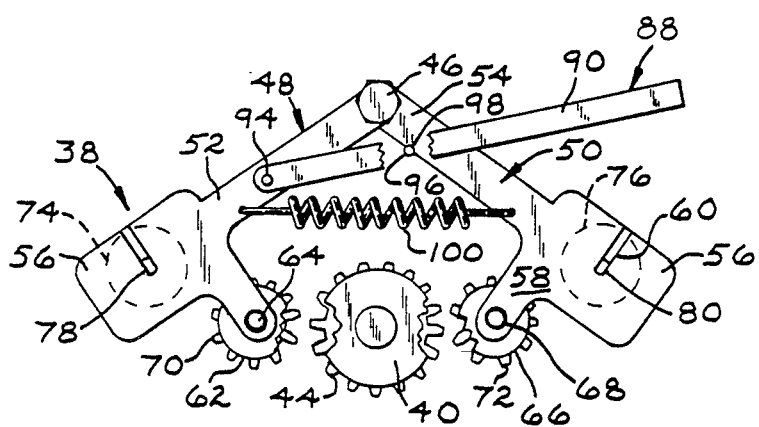
Fig-6
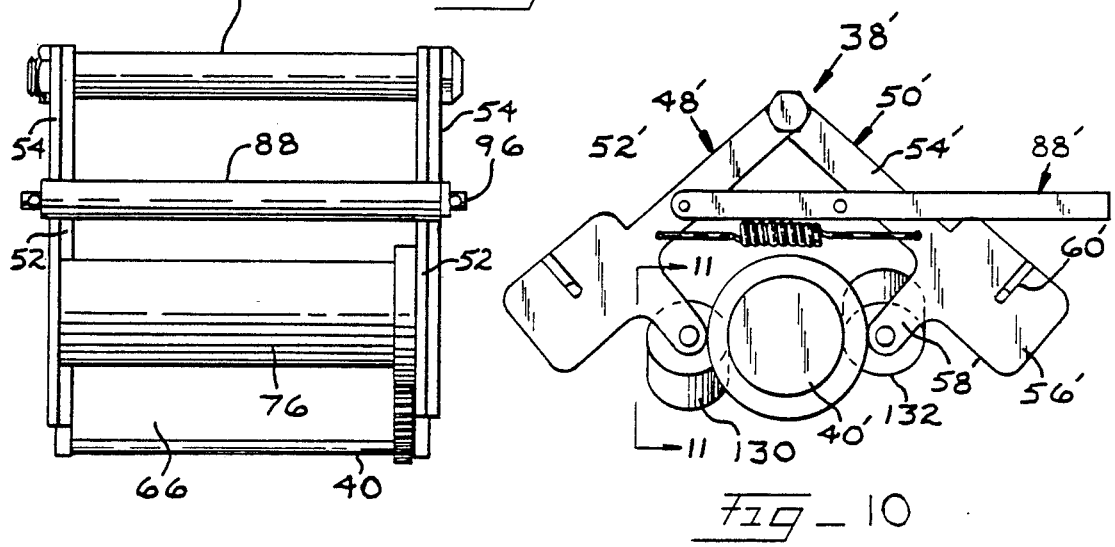
Fig-7
Fig-10
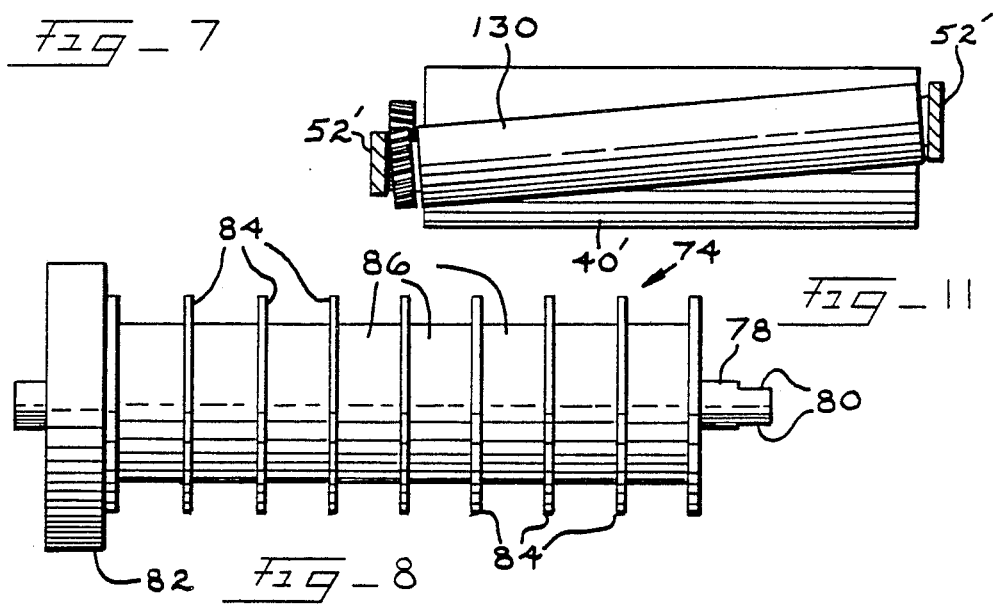
Fig-11
Fig-8

BELT TYPE OIL SKIMMER WITH HORIZONITAL ROLLERS

BACKGROUND OF THE INVENTION

As oil is lighter than water in solutions of water and oil, such as coolants employed with cutting tools, the oil collects on the surface of the body of liquid and devices are known for removing the oil from the liquid.

Oil skimming or other floating material separators utilize rotary discs, webs, ropes and endless belts which pass through the surface of the liquid and as the oil adheres to the moving collector it can be removed therefrom by squeezing or scraping operations. United States patents disclosing oil separating devices of the endless belt or web type are shown in U.S. Pat. Nos. 3,314,545; 3,508,663; 3,640,394; 3,709,369; 4,154,683; 4,274,957; 4,652,372 and 4,582,604. Such patents employ pressure rollers or scrapers to remove the oil from the belt or web and prior art devices have encountered problems in efficiently removing the oil without reintroducing a substantial portion thereof back into the body of liquid being processed which significantly lowers the efficiency of separation.

Oil skimmers using flexible belts and webs can be more concisely constructed than oil removing apparatus using rigid collectors such as rotating discs. However, oil collectors using flexible belts and webs often use doctor and scraper blades for removing the oil from the blade, but such devices require constant maintenance and replacement in view of the high wear occurring.

Oil skimmers of the belt type utilizing the pressure of rollers to remove the oil from the belt do not wear the belt or web to the extent of doctor or scraper blades, but problems have been encountered with roller type oil remover systems in dissipating the oil removed from the belt by the roller pressure. Such problems with respect to oil removal from a belt have been successfully overcome by the oil removing apparatus shown in the assignee's U.S. patent application Ser. No. 07/469,352 filed Jan. 24, 1990, wherein the primary drive roller axis of rotation is substantially vertically oriented. In such apparatus the oil collecting belt is necessarily twisted as it passes about the vertically oriented upper drive roller and passes under the lower horizontally oriented weight roller submerged in the liquid being processed, and the twisted belt configuration of this construction, while highly advantageous with most installations, creates problems where an exceptionally long oil collecting belt must be used.

It is an object of the invention to provide apparatus of the oil removing or skimming type utilizing a flat belt or web wherein the belt is threaded over the upper portion of a primary drive roller having a horizontal axis of rotation and the oil is removed by pressure rollers maintaining the belt in engagement with the primary roller, and yet the removed oil is readily collected below the primary and pressure rollers.

Another object of the invention is to provide oil skimming apparatus of the endless belt type which reduces belt wear and has a high oil removal efficiency, and may be used in installations requiring endless belts of considerable length.

A further object of the invention is to provide oil skimming apparatus of the endless belt type utilizing a substantially horizontally disposed drive roller having pressure rollers located upon opposite sides of the drive roller maintaining the endless oil collecting belt in firm engagement with the drive roller wherein the collected oil is removed from the belt by roller pressure.

An additional object of the invention is to provide belt type oil skimming apparatus employing pressure rollers in conjunction with a primary drive roller wherein the pressure rollers are mounted upon linkage sets biased toward the drive roller for maintaining firm engagement of the pressure rollers with the belt and the belt in engagement with the drive roller, the linkage sets including an actuator for displacing the pressure rollers away from the drive roller to permit easy belt removal and new belt installation.

Another object of the invention is to provide belt type oil skimming apparatus employing a substantially horizontally disposed drive roller in conjunction with a plurality of pressure rollers located upon opposite sides of the drive roller wherein the drive rollers are mounted upon a pair of linkage sets, and each set also includes a belt reversing roller to permit the desired orientation of the belt to the associated pressure roller, and the reversing rollers are mounted upon their associated linkage set in such a manner as to permit ease of removal during endless belt replacement.

Yet another object of the invention is to provide oil skimming apparatus of the endless belt type wherein a pair of pressure rollers are located upon opposite sides of a horizontally disposed primary drive roller, and the axes of rotation of the drive roller and at least one of the pressure rollers are obliquely oriented to aid in the removal of collected oil from the belt under gravitational forces.

In the practice of the invention a frame supports a roller unit assembly, and the frame may be mounted adjacent a reservoir containing the liquid from which oil is to be removed. The frame may be mounted directly to a machine tool having such a reservoir, or the frame may be mounted upon a portable collecting receptacle which may be located adjacent the body of liquid to be treated. Preferably, the frame is vertically adjustably mounted upon its support and the frame includes a housing for an electric motor which rotates a primary drive roller about a substantially horizontal axis.

The endless oil collecting belt is threaded over the upper portion of the drive roller and a pair of pressure rollers are mounted upon the frame adjacent the primary roller on opposite sides thereof and the pressure rollers are mounted upon linkage sets which are spring biased toward the drive roller such that the pressure rollers may engage the belt and maintain the belt in a frictional relationship with the drive roller. The linkage sets also include belt reversing rollers whereby the belts engage almost one-half of the circumference of the pressure rollers assuring effective oil removal. The primary drive roller is of a cantilever configuration having a free end whereby the oil collecting belt may be easily inserted over the drive roller end, or removed therefrom, and as the endless belt engages the underside of the pressure rollers in a freely accessible manner, and as the reversing rollers may be easily temporarily removed from their associated linkage sets during belt replacement, it is possible to change the endless belt without requiring special tools or skills.

The lower end of the endless belt extends into the liquid to be processed, and a weighted roller maintains the configuration of the belt during operation.

A V-shaped collection receptacle is located beneath the roller unit for collecting the oil removed from the belt as it falls under gravitational forces to the collection receptacle. Collected oil flows from the collection receptacle to a collecting reservoir.

In an embodiment of the invention the axis of the pressure roller may be slightly inclined to the horizontal in a non-parallel relationship to the primary drive roller axis to aid in the flow of removed oil from the "upper" portion of the belt as it engages the pressure roller.

BRIEF DESCRIPTION OF THE DRAWINGS

The aforementioned objects and advantages of the invention will be appreciated from the following description and accompanying drawings wherein:

FIG. 1 is a front elevational view of oil skimming apparatus in accord with the invention, the pressure rollers being shown in an operative condition, FIG. 2 is a side elevational view of the apparatus of FIG. 1 as taken from the right thereof, FIG. 3 is a partial perspective view of the roller unit illustrating the endless oil collecting belt as threaded through the roller unit, FIG. 6 is a front elevational view of the roller unit illustrating the linkage sets in the open condition as during belt replacement, FIG. 7 is a side elevational view of the roller unit as taken from the right, FIG. 8 is an enlarged detailed view of the reversing roller first engaging the oil laden belt, FIG. 9 is an enlarged detail view of the belt weight roller, FIG. 10 is a front elevational view of another embodiment of roller unit wherein the pressure rollers are obliquely related to the horizontal and the primary roller axis, and FIG. 11 is an elevational sectional view as taken along Section 11—11 of FIG. 10.

DESCRIPTION OF THE PREFERRED EMBODIMENTS

Figure 4:
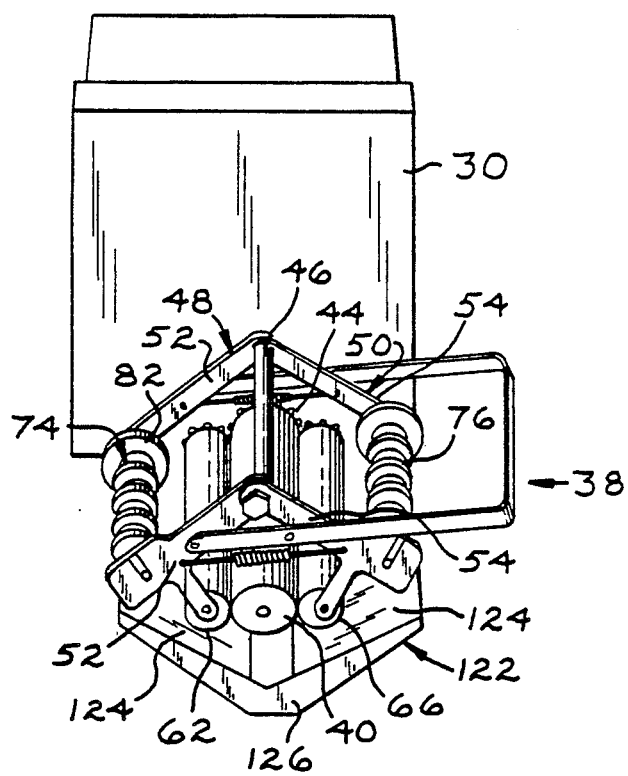
FIG. 4 is a perspective view of the roller unit with the endless belt removed and the pressure rollers in engagement with the drive roller.

With reference to FIGS. 1 and 2, apparatus in accord with the invention as mounted upon a portable oil collecting reservoir is illustrated. The apparatus includes a frame 10 mounted upon the reservoir 12 by means of a channel shaped bracket 14 which is vertically oriented for receiving the complimentary shaped frame stem 16. The stem includes vertically spaced holes 18 whereby a bolt 20 inserted through the bracket 14 in alignment with predetermined holes 18 will locate the frame at the desired vertical orientation.

The reservoir 12 constitutes a portable support for the frame 10 as it is mounted upon wheels 22 and includes a drain 24 permitting the reservoir to be emptied, and a handle 26. A vertically oriented inlet pipe 28 may be used in conjunction with the oil collector receptacle, as later described, with respect to introducing the collected oil into the reservoir.

It is to be appreciated that the frame 10 need not necessarily be mounted upon the illustrated reservoir 12. For instance, the frame 10 can be mounted upon a conventional drum located adjacent the body of water and oil to be processed. In such an installation the collected oil will flow into the drum, or similarly, the frame 10 may be mounted upon the base of a machine tool using a coolant which is to be processed and the collected oil drained into a drum or conduit system for handling the separated oil.

A cabinet 30 is mounted upon the frame 10 of a generally rectangular configuration and houses the motor 32, FIG. 2, which has a horizontally disposed drive shaft connected to a step-down transmission 34 having an output shaft 36 which extends through the front wall of the cabinet 30.

The roller unit 38 is mounted upon the front wall of the cabinet 30 and includes a cylindrical primary drive roller 40 mounted upon the end of the transmission output shaft 36 for rotation by the motor 32. The drive roller 40 is of a cantilever mounting having a free or open end, and includes a concentric set of gear teeth 44 at its inner end. The linkage sets supporting the pressure and reversing rollers are supported by the pivot bolt 46 extending from the cabinet 30 and the roller unit 38 further includes linkage set 48 and linkage set 50 both pivotally mounted upon the bolt 46 for rotation about the horizontal bolt. Linkage set 48 includes spaced arms 52 while the linkage set 50 includes spaced arms 54. Each of the outer arms 52 and 54 are provided with an enlarged apron 56, and each of the linkage set arms also includes a bell crank extension 56 for supporting the associated pressure roller as later described. Parallel slots 60 are defined in the arm aprons 56 for cooperating with the reversing roller shafts as described below.

A cylindrical pressure roller 62 is rotatably mounted upon the linkage set 48 by a pivot shaft 64 extending between the arms 52, and in a similar manner the pressure roller 66 is rotatably mounted upon the linkage set 50 by the pivot shaft 68 extending between the arms 54. Pressure roller 62 includes concentric gear teeth 70 located adjacent its inner end, while the pressure roller 66 includes the gear teeth 72. In the embodiment shown in FIGS. 1-7 the axes of rotation of the pressure rollers 62 and 66 is horizontal and parallel to the axis of rotation of the drive roller 40.

A belt reversing roller 74 is mounted upon the linkage set 48 while the belt reversing roller 76 is rotatably mounted upon the linkage set 50. With reference to FIG. 8, the reversing roller 74 is mounted upon the shaft 78 having parallel flats 80 defined upon the outer end and a concentric flange 82 is located upon the roller 74 adjacent its inner end to help guide the belt. Reversing roller 74 includes a plurality of axially spaced cylindrical discs 84 defining the operative circumference of the roller, and the discs are maintained in spaced relationship by the spacers 86.

Figure 5:
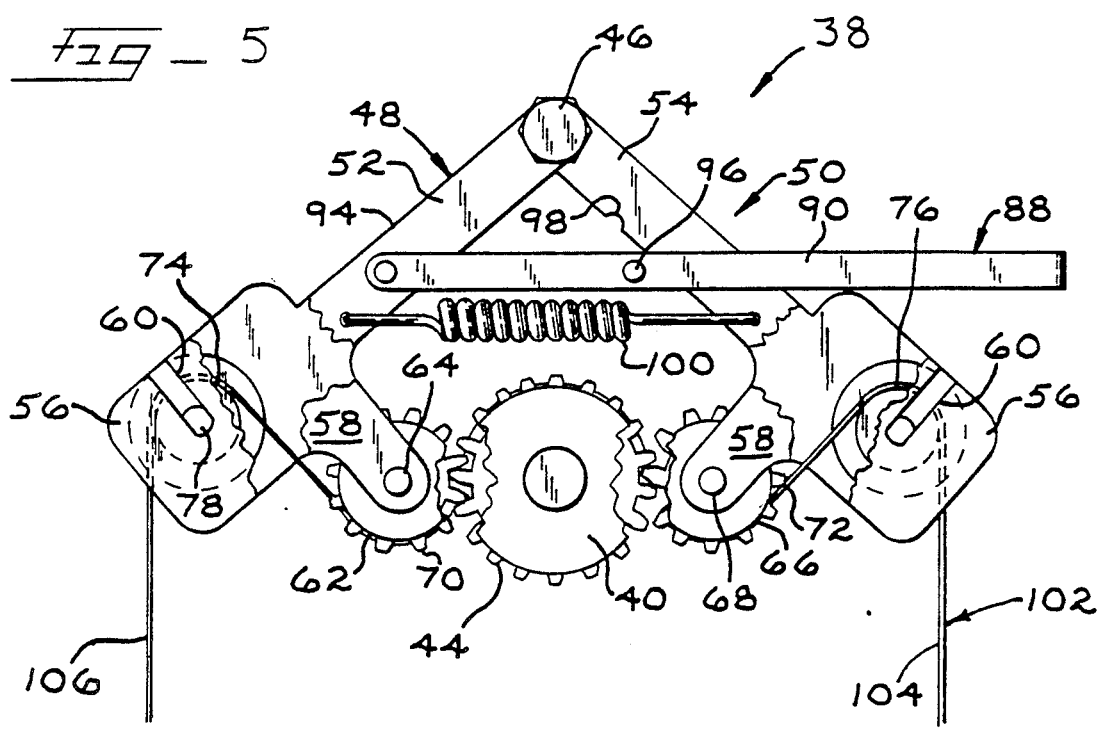
FIG. 5 is an enlarged detailed front view of the roller unit, partially broken away, illustrating the belt as threaded through the roller unit.

A linkage set actuator 88 is operatively associated with the linkage sets 48 and 50 for selectively pivoting the linkage sets between an operative oil removing position, FIG. 5, and an open belt replacement condition as shown in FIG. 6. The linkage actuator is of a U configuration including parallel legs 90 interconnected by a base 92. The outer ends of the legs 90 are pivotally connected at 94 to the arms 52, and a pin 96 extends between the legs 90 for selective engagement with the notches 98 defined in the arms 54 of the linkage set 50. A pair of tension springs 100 are interposed between the linkage sets 48 and 50, as apparent from the drawings, biasing the linkage sets toward each other and the pressure rollers 62 and 66 toward the drive roller 40.

The oil is collected upon an endless belt 102 having an inner side 104 and an outer side 106. The lower portion of the belt defines a lower loop 108, and the loop 108 will be submersed in the liquid being processed whose surface is shown at A in FIG. 1. Preferably, a weighted roller unit 110, FIG. 9, is located within the loop 108 and the weighted roller includes a base 112 from which parallel legs 114 extend. A shaft 116 is mounted upon the legs 114 supporting the roller 118 which is located within the belt loop 108. A weight 120 attached to the base 112 adds to the mass of the weighted roller unit 110 for maintaining the lower portion of the belt in the desired relationship to the liquid being cleaned.

A V-shaped collection receptacle 122 is mounted upon the cabinet 30 below the roller unit 38 for collecting the oil removed from the belt 102 by the roller unit. The collection receptacle includes downwardly converging sides 124 and inner and outer end plates 126, the outer end plate being visible in FIG. 4. A drain opening, not shown, is located in the lower region of the collection receptacle 122 and a flexible drain hose 128 is attached thereto which may be inserted into the inlet pipe 28 of collection reservoir 12. The hose 128 may be positioned with respect to whatever type of collection reservoir is used and its association with the inlet pipe 28 is of advantage in that it permits effective draining of the collected oil into the reservoir 12 regardless of the vertical positioning of the frame 10 on the reservoir.

Under normal operating conditions the components of the roller unit 38 will be as shown as in FIGS. 1, 3 and 5. The belt 102 passes over the reversing roller 74, under the pressure roller 62, over the upper half of the circumference of the drive roller 40, under the pressure roller 66, and over the reversing roller 76. This threading of the belt 102 through the roller unit 38 is readily apparent from FIG. 5. In this relationship the belt outer surface 106 will engage the pressure rollers 62 and 66, while the belt inner surface 104 engages the reversing rollers 74 and 76 and the surface of the drive roller 40.

The linkage actuator 88 will be in the position shown in FIG. 5 wherein the pin 96 is not in alignment with the notches 98, and the tension springs 100 bias the linkage set 48 in a counterclockwise direction and the linkage set 50 in a clockwise direction. The biasing force of the springs 100 maintains a firm engagement of the circumferences of the pressure rollers 62 and 64 against the belt 102, and the weight of the belt depending from the reversing rollers 74 and 76 maintains the belt firmly upon the reversing rollers.

In the operating oil removing condition shown in FIG. 5 the drive roller gear teeth 44 will be meshing with the gear teeth 70 and 72 of the pressure rollers 62 and 66, respectively. Accordingly, this positive driving of the pressure rollers aids in the movement of the belt through the roller unit 38 minimizing slippage between the belt and rollers and thereby reducing belt wear.

The drive roller 40 rotates in a clockwise direction as viewed in FIG. 5 causing the portion of the belt rising from the liquid being processed to initially engage the reversing roller 74. As the inner side 104 of the belt will engage the periphery of the discs 84 the use of the discs minimizes premature oil removal from the belt. The circumference of the reversing roller 76 is continuous and cylindrical, and it is not necessary to use discs with the roller 76 as the oil has been removed from the belt by the time the belt engages reversing roller 76.

The firm engagement between the belt side 106 and the pressure roller 62, and the firm engagement between the belt side 104 with the periphery of the drive roller 40 squeezes the oil collected on the belt sides from the belt surfaces. This oil will collect and fall into the collection receptacle 122 located below the roller unit 38. The "puddle" of oil collecting between the belt side 106 and the periphery of the pressure roller 62 run across the width of the belt falling into the receptacle 122, while the oil removed from the belt surface 104 at the drive roller 40 directly falls into the receptacle 122. Movement of the belt into engagement with the pressure roller 66 tends to further remove oil from the belt 102, and it will therefore be appreciated that by the engagement of the belt with the two pressure rollers 62 and 66, and with the drive roller 40, the belt sides may be effectively cleared of the collected oil and as the portion of the belt moving downwardly after it passes over the reversing roller 76 moves into the liquid being treated the belt, again, collects oil particles as it leaves the treated liquid and returns to the roller unit.

The arrangement of the reversing rollers 74 and 76 with respect to the associated pressure rollers 62 and 64, respectively, and the arrangement of the pressure rollers 62 and 64 with respect to the drive roller 44 permits substantially one-half of the circumference of the pressure rollers to be in engagement with the belt side 106, while the location of the pressure rollers to the drive roller 40 permits the belt to pass over substantially the 180° upper portion of the drive roller circumference. This extensive engagement of the belt with the pressure rollers and the drive rollers has a twofold advantage, i.e. sufficient friction is produced to effectively translate the belt, and secondly, such extensive contact between the belt and rollers effectively removes the oil from the belt.

When it is desired to replace the belt 102 the linkage actuator 88 is pivoted counterclockwise about pivot 94 to the position shown in FIG. 6. By raising the base 92 the pin 96 can be received into the notches 98 defined in the arms 54 of the linkage set 50. This relationship, due to the engagement of the pin 96 against the lower surface of the arms 54 pivots the linkage set arms and separates the linkage sets and pressure rollers 62 and 66 as apparent in FIG. 6 against the biasing force of the springs 100. While the inner end of the shafts of the reversing rollers 74 and 76 are mounted within holes within the inner arms 52 and 54 the outer portions of the reversing roller shafts include the flats 80 which correspond to the spacing between the apron slots 60. The slots 60 permit the outer ends of the reversing roller shafts to be lifted from the associated linkage set and removed from engagement with the belt 102. Thereupon, the belt 102 may be directly pulled from the drive roller 40. The replacement belt is located on the upper portion of the drive roller 40, passes under the pressure rollers 62 and 66, and is lifted sufficiently in the region of the aprons 56 to permit the reversing rollers 74 and 76 to be inserted thereunder and the ends of the reversing rollers associated with the arms and slots of the associated linkage sets to permit the belt to be threaded about the rollers of the roller unit as shown in FIG. 5. Thereupon, the actuator 88 is pivoted clockwise, FIG. 6, removing the pin 96 from the notches 98 and the roller unit returns to the operative condition shown in FIG. 5 for removing oil from the belt 102.

A modification of a roller unit is shown in FIGS. 10 and 11 wherein components identical to those previously described are indicated by primed references numerals. The roller unit 38' is identical to that previously described except the bell crank extensions 58' on the outer ends 52' and 54' are of a slightly different length than the bell crank extensions on the other arm of the same linkage set. In this manner the axis of the pressure rollers 130 and 132 is slightly oblique with respect to the horizontal as will be appreciated from FIG. 11. This oblique relationship is particularly of advantage with respect to pressure roller 130 wherein the majority of the oil is removed from the belt.

The oblique orientation of the axis of rotation of the pressure roller 130 aids in the gravitational draining of the oil collecting between the intersection of the surface of the pressure roller 130 and the belt side 106. The pressure roller 132 may be inclined in an oblique relationship in the opposite direction to compensate for any widthwise axial thrust imposed on the belt by the oblique orientation of the roller 130, and likewise, an oblique orientation of roller 132 aids in the draining of the oil as accumulates between the drive roller 40' and the roller 132.

It is appreciated that various modifications to the inventive concepts may be apparent to those skilled in the art without departing from the spirit and scope of the invention.

I claim:

1. Apparatus for removing oil or the like from the horizontal surface of a body of liquid comprising, in combination, a frame adapted to be supported adjacent the body of liquid from which oil is to be removed, a primary elongated roller rotatably mounted on said frame for rotation about a substantially horizontal axis, said roller having an outer surface adapted to receive a substantially flat belt, a substantially flat endless belt having first and second sides, said belt first side engaging said roller, a pair of pressure rollers rotatably mounted on said frame movable toward and away from said primary roller, biasing means biasing said pressure rollers toward said primary roller, said pressure rollers being located substantially diametrically opposed to each other relative to said primary roller whereby said pressure rollers maintain said belt first side in engagement with approximately one half of the circumference of said primary roller, a motor mounted on said frame operatively connected to at least one of said rollers for rotating said rollers about their axes of rotation, and a collection receptacle mounted on said frame below said rollers receiving oil removed from said belt by said pressure rollers, said belt depending below said primary roller and pressure rollers and below said receptacle into the body of liquid from whose surface oil is removed.

2. In apparatus as in claim 1, said pressure rollers having substantially parallel axes of rotation substantially parallel to the axis of said primary roller.

3. In apparatus as in claim 1, first and second sets of linkages pivotally mounted upon said frame for movement toward and away from said pressure roller, one of said pressure rollers being mounted upon each linkage set, said biasing means comprising spring means interposed between said linkage sets biasing said linkage sets and said pressure rollers toward each other thereby biasing said pressure rollers into engagement with said second side of said belt.

4. In apparatus as in claim 3, a first reversing roller mounted upon said first linkage set, and a second reversing roller mounted upon said second linkage set, said reversing rollers each having an axis of rotation substantially parallel to said pressure roller mounted upon the associated linkage set.

5. In apparatus as in claim 4, quick release means supporting said reversing rollers upon the associated linkage set.

6. In apparatus as in claim 5, said first reversing roller having a belt engaging surface comprising a plurality of axially spaced discs of limited axial dimension whereby said first reversing roller engages said belt first side at limited locations.

7. In apparatus as in claim 6, said second reversing roller having a substantially cylindrical surface of continuous diameter throughout its axial length.

8. In apparatus as in claim 3, a control lever pivotally mounted upon one of said linkage sets and selectively operatively associated with positioning means defined upon the other linkage set whereby pivoting of said control lever in a first direction separates said pressure rollers from each other and from engagement with said belt second side.

9. In apparatus as in claim 1, said primary roller having a free cantilever end and a drive end, said motor being operatively connected to said primary roller drive end.

10. In apparatus as in claim 1, an oil retaining reservoir supporting said frame, and conduit means establishing communication between said collection receptacle and said retaining reservoir.

11. In apparatus as in claim 10, vertical adjustment means defined on said frame supporting said rollers, motor and collection receptacle for selective vertical adjustment on said frame, said conduit means including telescoping conduit members defined on said receptacle and said reservoir maintaining communication between said receptacle and reservoir at all positions of said adjustment means.

12. In apparatus as in claim 1, said endless belt including a reversing loop at its lowermost position, said reversing loop including a U-shaped bracket having a base and substantially parallel legs, a shaft extending between said legs, a roller rotatably mounted on said shaft, said belt extending between said roller and said base, and a weight defined upon said reversing loop base.

13. In apparatus as in claim 1, gears defined upon said primary and pressure rollers, said gears defined upon said pressure rollers meshing with said primary roller gear when said pressure rollers are in engagement with said belt first side.

14. Apparatus for removing oil or the like from the horizontal surface of a body of liquid comprising, in combination, a frame adapted to be supported adjacent the body of liquid from which oil is to be removed, a primary elongated roller rotatably mounted on said frame for rotation about a substantially horizontal axis, said roller having an outer surface adapted to receive a substantially flat belt, a substantially flat endless belt having first and second sides, said belt first side engaging said roller, a pair of pressure rollers rotatably mounted on said frame, said pressure rollers being located upon opposite sides of said primary roller whereby said pressure rollers maintain said belt first side in engagement with the circumference of said primary roller, a motor mounted on said frame operatively connected to at least one of said rollers for rotating said rollers about their axes of rotation, and a collection receptacle mounted on said frame below said rollers receiving oil removed from said belt by said pressure rollers, said belt depending below said primary roller and pressure rollers and below said receptacle into the body of liquid from whose surface oil is to removed, said pressure roller first receiving said belt having an axis of rotation obliquely oriented to the horizontal and non-parallel to the axis of said primary roller.

15. Apparatus for removing oil or the like from the horizontal surface of a body of liquid comprising, in combination, a frame a frame housing adjustably mounted on said frame for selective vertical adjustment thereto, a primary drive roller rotatably mounted on said frame having a substantially horizontal axis of rotation and an outer cantilevered end, an inner end, and a substantially cylindrical circumference, an electric motor mounted on said frame housing operatively connected to said primary roller inner end for rotating said primary roller about its axis, an endless flat belt having first and second sides extending about said primary roller and including a loop portion depending below said housing adapted to be submerged in the body of liquid from which oil is to be removed, said belt extending about said primary roller wherein said first side engages said roller circumference, first and second linkage sets pivotally mounted on said frame adjacent said primary roller for movement toward and away from said primary roller, a first pressure roller rotatably mounted on said first linkage set and a second pressure roller rotatably mounted upon said second linkage set, spring means biasing said linkage sets towards each other, said pressure rollers being located substantially diametrically opposed to each other relative to said primary roller whereby said biasing means biases said pressure rollers towards said belt second side for maintaining engagement of said belt first side with approximately one half of said primary roller circumference, a reversing roller mounted upon each of said linkage sets, quick release means supporting each reversing roller upon its associated linkage set, said endless belt adapted to pass over the circumference of said reversing rollers and under said pressure rollers and over the upper circumferential region of said primary roller, linkage positioning means selectively associated with said linkage sets for separating said linkage sets to selectively displace said pressure rollers away from said primary roller for permitting said endless belt to be mounted upon said primary roller, a collection receptacle mounted on said frame housing below said primary and pressure rollers collecting oil removed from said belt by said rollers, and an oil removing conduit in communication with said collection receptacle.

16. In apparatus as in claim 15, said endless belt including a reversing loop at its lowermost portion, a weight roller supported within said loop having an axis of rotation substantially parallel to the surface of the body of liquid from which oil is being removed.

17. In apparatus as in claim 15, gears defined on said primary and pressure rollers, said gears defined on said pressure rollers meshing with said primary roller gear when said pressure rollers are engaging said endless belt second side.

18. Apparatus for removing oil or the like from the horizontal surface of a body of liquid comprising, in combination, a frame, a frame housing adjustably mounted on said frame for selective vertical adjustment thereto, a primary drive roller rotatably mounted on said frame having a substantially horizontal axis of rotation and an outer cantilevered end, an inner end, and a substantially cylindrical circumference, an electric motor mounted on said frame housing operatively connected to said primary roller inner end for rotating said primary roller about is axis, an endless flat belt having first and second sides extending about said primary roller and including a loop portion depending below said housing adapted to be submerged in the body of liquid from which oil is to be removed, said belt extending about said primary roller wherein said first side engages said roller circumference, first and second linkage sets pivotally mounted on said frame adjacent said primary roller, a first pressure roller rotatably mounted on said first linkage set and a second pressure roller rotatably mounted upon said second linkage set, spring means biasing said linkage sets towards each other, said pressure rollers being located upon opposite sides of said primary roller whereby said biasing means biases said pressure rollers towards said belt second side for maintaining engagement of said belt first side with said primary roller circumference, a reversing roller mounted upon each of said linkage sets, quick release means supporting each reversing roller upon its associated linkage set, said endless belt adapted to pass over the circumference of said reversing rollers and under said pressure rollers and over the upper circumferential region of said primary roller, linkage positioning means selectively associated with said linkage sets for separating said linkage sets to selectively displace said pressure rollers away from said primary roller for permitting said endless belt to be mounted upon said primary roller, a collection receptacle mounted on said frame housing below said primary and pressure rollers collecting oil removed from said belt by said rollers, and an oil removing conduit in communication with said collection receptacle, said pressure roller first receiving said belt having an axis of rotation obliquely oriented to the horizontal and non-parallel to the axis of said primary roller.

* * * * *